United States Patent
Wei et al.

(10) Patent No.: US 11,868,105 B2
(45) Date of Patent: Jan. 9, 2024

(54) METHOD AND APPARATUS FOR DYNAMICALLY DETERMINING YAW CONTROL PRECISION

(71) Applicant: BEIJING GOLDWIND SCIENCE & CREATION WINDPOWER EQUIPMENT CO., LTD., Beijing (CN)

(72) Inventors: Hao Wei, Beijing (CN); Wei Yang, Beijing (CN)

(73) Assignee: BEIJING GOLDWIND SCIENCE & CREATION WINDPOWER EQUIPMENT CO., LTD., Beiing (CN)

( * ) Notice: Subject to any disclaimer, the term of this patent is extended or adjusted under 35 U.S.C. 154(b) by 370 days.

(21) Appl. No.: 16/763,226

(22) PCT Filed: Aug. 1, 2018

(86) PCT No.: PCT/CN2018/097911
§ 371 (c)(1),
(2) Date: May 12, 2020

(87) PCT Pub. No.: WO2019/165752
PCT Pub. Date: Sep. 6, 2019

(65) Prior Publication Data
US 2021/0071638 A1     Mar. 11, 2021

(30) Foreign Application Priority Data

Feb. 28, 2018     (CN) .......................... 201810168123.4

(51) Int. Cl.
*F03D 7/02*     (2006.01)
*G05B 17/00*     (2006.01)
(Continued)

(52) U.S. Cl.
CPC ........... *G05B 17/00* (2013.01); *F03D 7/0204* (2013.01); *F03D 7/045* (2013.01); *F03D 17/00* (2016.05);
(Continued)

(58) Field of Classification Search
CPC .... F03D 7/0204; F03D 17/00; F05B 2270/32; F05B 2270/321
See application file for complete search history.

(56) References Cited

U.S. PATENT DOCUMENTS 9,982,656 B2 *  5/2018  Li ........................... G01B 21/22
2006/0140761 A1  6/2006  LeMieux
(Continued)

FOREIGN PATENT DOCUMENTS

CN     101012809 A     8/2007
CN     103899497 A     7/2014
(Continued)

OTHER PUBLICATIONS

First Office Action from corresponding Australian Application No. 2018411217, dated Mar. 1, 2021 (6 pgs.).
(Continued)

*Primary Examiner* — Christopher R Legendre
(74) *Attorney, Agent, or Firm* — Bayes PLLC

(57) ABSTRACT

A method and an apparatus for dynamically determining a yaw control precision. The method comprises: during a predetermined time period, collecting a plurality of wind speed data and a plurality of wind direction data, and processing the collected plurality of wind speed data and plurality of wind direction data; on the basis of the processed wind speed data and wind direction data, establishing a model of the corresponding relationship between wind speed, wind direction angle change, yaw control precision, yaw fatigue, and power loss; and, on the basis of the current (Continued)

wind speed data, wind direction data, predetermined yaw fatigue range, and predetermined power loss range, by means of the corresponding relationship model, determining the yaw control precision corresponding to the current wind speed and current wind direction angle change.

12 Claims, 2 Drawing Sheets

(51) Int. Cl.
  *F03D 7/04* (2006.01)
  *G05B 19/04* (2006.01)
  *G05B 13/04* (2006.01)
  *F03D 17/00* (2016.01)

(52) U.S. Cl.
  CPC ......... *G05B 13/04* (2013.01); *G05B 19/0415* (2013.01); *F05B 2270/32* (2013.01); *F05B 2270/321* (2013.01); *F05B 2270/329* (2013.01); *G05B 2219/2619* (2013.01)

(56) References Cited

U.S. PATENT DOCUMENTS

| | | |
|---|---|---|
| 2010/0066087 A1 | 3/2010 | Hayashi et al. |
| 2011/0123331 A1 | 5/2011 | Stiesdal |
| 2014/0186176 A1 | 7/2014 | Andersen et al. |
| 2018/0187649 A1 | 7/2018 | Spruce et al. |
| 2018/0223808 A1 | 8/2018 | Spruce |
| 2018/0298880 A1 | 10/2018 | Ma et al. |
| 2021/0071638 A1* | 3/2021 | Wei .......................... F03D 17/00 |

FOREIGN PATENT DOCUMENTS

| | | | |
|---|---|---|---|
| CN | 104018987 A | 9/2014 | |
| CN | 104196680 A | 12/2014 | |
| CN | 104314754 A | 1/2015 | |
| CN | 104632521 A | 5/2015 | |
| CN | 105569922 A | 5/2016 | |
| CN | 106150904 A | 11/2016 | |
| CN | 107152374 A | 9/2017 | |
| DK | 201570559 A1 | 8/2015 | |
| EP | 2351931 B1 | 5/2014 | |
| GB | 2545448 A | 6/2017 | |
| WO | WO-2016086778 A1 * | 6/2016 | ............ F03D 17/00 |
| WO | 2017000957 A1 | 1/2017 | |
| WO | 2017181798 A1 | 10/2017 | |
| WO | 2017205221 A1 | 11/2017 | |

OTHER PUBLICATIONS

First Office Action from corresponding Chinese Application No. 201810168123.4, dated Dec. 27, 2019 (10 pgs.).

European Search Report from corresponding European Application No. 18907756.3, dated Mar. 18, 2021 (6 pgs.).

First Office Action from corresponding Indian Application No. 202017017261, dated Mar. 8, 2021 (6 pgs.).

International Search Report and Written Opinion in corresponding PCT Application No. PCT/CN2018/097911, dated Nov. 29, 2018, 9 pages.

* cited by examiner

METHOD AND APPARATUS FOR DYNAMICALLY DETERMINING YAW CONTROL PRECISION

CROSS-REFERENCE TO RELATED APPLICATIONS

The present application is the US National Phase of International Application No. PCT/CN2018/097911, filed on Aug. 1, 2018, which claims the benefits of priority to Chinese Patent Application No. 201810168123.4, titled "METHOD AND APPARATUS FOR DYNAMICALLY DETERMINING YAW CONTROL PRECISION", filed on Feb. 28, 2018. The entire contents of each of the above-identified applications are incorporated herein by reference.

FIELD

The present disclosure relates to the field of wind power generation technology, and in particular to a method and an apparatus for dynamically determining yaw control precision.

BACKGROUND

At present, an active yaw technology is generally adopted in a large megawatt-scale wind turbine to take full advantage of wind energy and achieve an optimum power generation efficiency. Wind speed data and wind direction data on which the active yaw technology is based are acquired by an anemoscope and a wind vane. However, a yaw error may be generated under influences of factors such as fluctuation and randomicity of wind speed and wind direction, zero setting error and a yaw control precision of a nacelle, thereby resulting in a power loss.

SUMMARY

According to an aspect of the present disclosure, a method for dynamically determining a yaw control precision is provided. The method may include: collecting, during a predetermined time period, multiple pieces of wind speed data and multiple pieces of wind direction data and processing the collected multiple pieces of wind speed data and multiple pieces of wind direction data; establishing, based on the processed wind speed data and wind direction data, a model of correspondence relationships between wind speed, variation angle of wind direction, yaw control precision, yaw fatigue value and power loss; and determining, based on current wind speed data and wind direction data, a predetermined range of yaw fatigue value and a predetermined range of power loss, a yaw control precision corresponding to a current wind speed and a current variation angle of wind direction by using the model of correspondence relationships.

According to another aspect of the present disclosure, an apparatus for dynamically determining a yaw control precision is provided. The apparatus may include: a data collection and processing module, a model establishing module and a precision determination module. The data collection and processing module is configured to collect, during a predetermined time period, multiple pieces of wind speed data and multiple pieces of wind direction data and process the collected multiple pieces of wind speed data and multiple pieces of wind direction data; the model establishing module is configured to establish, based on the processed wind speed data and wind direction data, a model of correspondence relationships between wind speed, variation angle of wind direction, yaw control precision, yaw fatigue value and power loss; and the precision determination module is configured to determine, based on current wind speed data and wind direction data, a predetermined range of yaw fatigue value and a predetermined range of power loss, a yaw control precision corresponding to a current wind speed and a current variation angle of wind direction by using the model of correspondence relationships.

According to another aspect of the present disclosure, a computer readable storage medium is provided. The computer readable storage medium stores instructions that, when executed by a processor, cause the processor to perform the method described above.

According to another aspect of the present disclosure, an apparatus for dynamically determining a yaw control precision is provided. The apparatus may include a processor and a memory. The memory stores instructions that, when executed by the processor, cause the processor to perform the method described above.

BRIEF DESCRIPTION OF THE DRAWINGS

Embodiments of the present disclosure are referred to in detail. Examples of the embodiments are shown in the drawings, where same reference numerals denote same elements throughout the drawings. The embodiments are described below with reference to the drawings so as to explain the present disclosure.

DETAILED DESCRIPTION OF EMBODIMENTS

Exemplary embodiments of the present disclosure are described in detail below with reference to the drawings.

Figure 1:
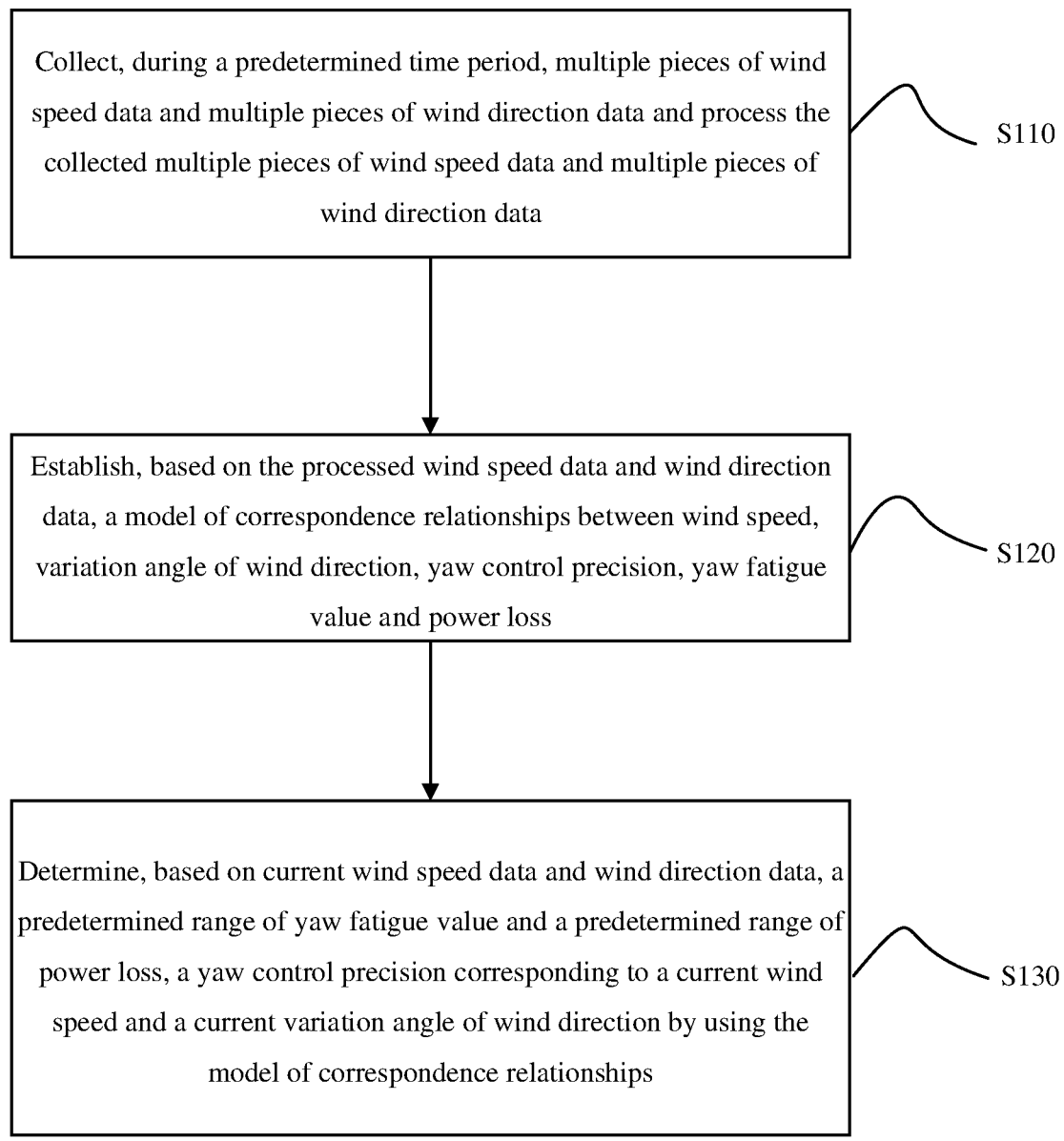
FIG. 1 shows a flowchart of a method for dynamically determining a yaw control precision according to an exemplary embodiment of the present disclosure.

FIG. 1 shows a flowchart of a method for dynamically determining a yaw control precision according to an exemplary embodiment of the present disclosure.

As shown in FIG. 1, the method for dynamically determining a yaw control precision may include a collecting and processing step S110, a model establishing step S120 and a precision determination step S130. In the collecting and processing step S110, multiple pieces of wind speed data and multiple pieces of wind direction data are collected during a predetermined time period and the collected multiple pieces of wind speed data and multiple pieces of wind direction data are processed. In the model establishing step S120, a model of correspondence relationships between wind speed, variation angle of wind direction, yaw control precision, yaw fatigue value and power loss is established based on the processed wind speed data and wind direction data. In the precision determination step S130, based on current wind speed data and wind direction data, a predetermined range of yaw fatigue value and a predetermined range of power loss, a yaw control precision corresponding to a current wind speed and a current variation angle of wind direction is determined by using the model of correspondence relationships.

As an example, the collecting and processing step S110 may include: collecting, during the predetermined time period, multiple pieces of wind speed data, determining multiple wind speed compartments and a representative wind speed of each wind speed compartment, determining a wind speed compartment to which each of the collected multiple pieces of wind speed data belongs and adjusting each of the collected multiple pieces of wind speed data to a representative wind speed of a wind speed compartment to which the piece of wind speed data belongs. In an embodiment, the collecting and processing step S110 may further include: collecting, during the predetermined time period, multiple pieces of wind direction data, determining multiple wind direction compartments and a representative wind direction of each wind direction compartment, determining a wind direction compartment to which each of the collected multiple pieces of wind direction data belongs and adjusting each of the collected multiple pieces of wind direction data to a representative wind direction of a wind direction compartment to which the piece of wind direction data belongs. The wind speed data and/or wind direction data referred to hereinafter may be adjusted as described above. A step of the compartment may be defined according to a standard of International Electro technical Commission (abbreviated as IEC) or customized. For example, in a case that the step of a wind speed compartment is 0.5 m/s and a representative wind speed of the wind speed compartment is 3 m/s, wind speed data from 2.75 m/s to 3.25 m/s may be adjusted to 3 m/s; in a case that the step of a wind direction compartment is 5° and a representative wind direction of the wind direction compartment is 3, wind direction data from 1 to 6° may be adjusted to 3°.

In addition, the collecting and processing step S10 may further include: performing a low-pass filtering on the collected multiple pieces of wind speed data and multiple pieces of wind direction data to filter out interference data.

As an example, a variation angle of a wind direction corresponding to each wind speed is calculated by the following operations: determining a wind direction corresponding to each wind speed; and calculating an angle variation value per unit time of a wind direction corresponding to each wind speed, and determining the angle variation value as the variation angle of the wind direction corresponding to the wind speed. An angle variation value per unit time of a wind direction corresponding to a current wind speed may be calculated and determined as a variation angle of the current wind direction. For example, in a case that the wind direction corresponding to the current wind speed is 5° and the wind direction varies from 5° to 8° within unit time, the variation angle of the current wind direction is 3°.

As an example, the yaw control precision corresponding to each wind speed may be calculated by the following operations: calculating a number of appearances of each variation angle of wind direction among variation angles of wind direction corresponding to each wind speed or an average of the variation angles of wind direction; and determining a variation angle of wind direction having the largest number of appearances or the average of the variation angles of wind direction as the yaw control precision corresponding to the wind speed. For each wind speed, in a case that the variation angle of wind direction is calculated by using different unit times, multiple variation angles of wind direction may be obtained. In this case, the variation angle of wind direction having the largest number of appearances among the calculated multiple variation angles of wind direction or the average of the variation angles of wind direction may be determined as the yaw control precision corresponding to the wind speed. However, the present disclosure is not limited to the calculation method herein. Rather, the yaw control precision corresponding to each wind speed may be calculated by using other proper methods. For example, a table showing a correspondence relationship between wind speed and yaw control precision or a table showing correspondence relationships between wind speed, variation angle of wind direction and yaw control precision may be established so as to acquire a yaw control precision as needed.

As an example, the yaw fatigue value is calculated by the following operations: calculating a service life consumed by a yaw system by simulation with each wind speed, the variation angle of wind direction and the yaw control precision that are corresponding to each wind speed, and determining the service life as the yaw fatigue value.

As an example, the power loss is calculated by the following operations: calculating power lost by the yaw system by simulation with each wind speed and the yaw control precision corresponding to each wind speed, and determined the power lost by the yaw system as the power loss.

As described above, a correspondence relationship between wind speed and variation angle of wind direction may be established by the operation of calculating the variation angle of wind direction corresponding to each wind speed. A correspondence relationship between wind speed and yaw control precision may be established by the operation of calculating the yaw control precision corresponding to each wind speed. Correspondence relationships between wind speed, variation angle of wind direction, yaw control precision and yaw fatigue value may be established by the operation of calculating the yaw fatigue value. Correspondence relationships between wind speed, yaw control precision and power loss may be established by the operation of calculating the power loss. The model of correspondence relationships between wind speed, variation angle of wind direction, yaw control precision, yaw fatigue value and power loss may be acquired based on these correspondence relationships. For example, based on the above correspondence relationships, a corresponding variation angle of wind direction can be acquired by a wind speed; a corresponding yaw control precision can be acquired by the wind speed; a corresponding yaw fatigue value can be acquired by the wind speed, the corresponding variation angle of wind direction and the corresponding yaw control precision; a corresponding power loss can be acquired by the wind speed and the corresponding yaw control precision, thereby acquiring the model of correspondence relationships.

The model of correspondence relationships may represent correspondence relationships between wind speed, variation angle of wind direction, yaw control precision, yaw fatigue value and power loss, such that at least one related group corresponding to a current wind speed and a current variation angle of wind direction may be determined. The at least one related group may have one yaw control precision, one yaw fatigue value and one power loss. Subsequently, a specific related group may be selected from the at least one related group based on a predetermined range of yaw fatigue value and a predetermined range of power loss. A yaw control precision in the specific related group is within the predetermined range of yaw fatigue value and a power loss in the specific related group is within the predetermined range of power loss. The yaw control precision in the specific related group may function as the yaw control precision corresponding to the current wind speed and the current variation angle of wind direction. If there are multiple specific related groups, a yaw control precision satisfying one of the following conditions may be selected from all yaw control precisions in the multiple specific related groups as a final yaw control precision: the largest yaw control precision among all the yaw control precisions, the smallest yaw control precision among all the yaw control precisions and an average of all the yaw control precisions.

As an example, the method according to the present exemplary embodiment may further include a precision adjustment step. In the precision adjustment step, the yaw control precision as determined corresponding to the current wind speed and the current variation angle of wind direction is adjusted based on at least one of the following: a magnitude of the current variation angle of wind direction, a topographic feature of a location of a wind turbine. For example, in a case that the current variation angle of wind direction is smaller than a first threshold, the yaw control precision should be improved; in a case that the current variation angle of wind direction is greater than a second threshold, the yaw control precision should be reduced.

According to exemplary embodiments of the present disclosure, in a case that the method for dynamically determining a yaw control precision according to the present disclosure is not performed, a yaw and a wind tracking are started if a variation angle of wind direction reaches 9° within 30 s and lasts for 3 min at 9°; in a case that the method for dynamically determining a yaw control precision according to the present disclosure is performed, a yaw control precision may vary from 9° to 3°, that is, a yaw and a wind tracking can be started if the variation angle of wind direction reaches 3 within 30 s and lasts for 3 min at 3°. Thus, the yaw and the wind tracking may be started in advance, such that wind energy can be utilized earlier and more highly, thereby improving power generation efficiency.

Figure 2:
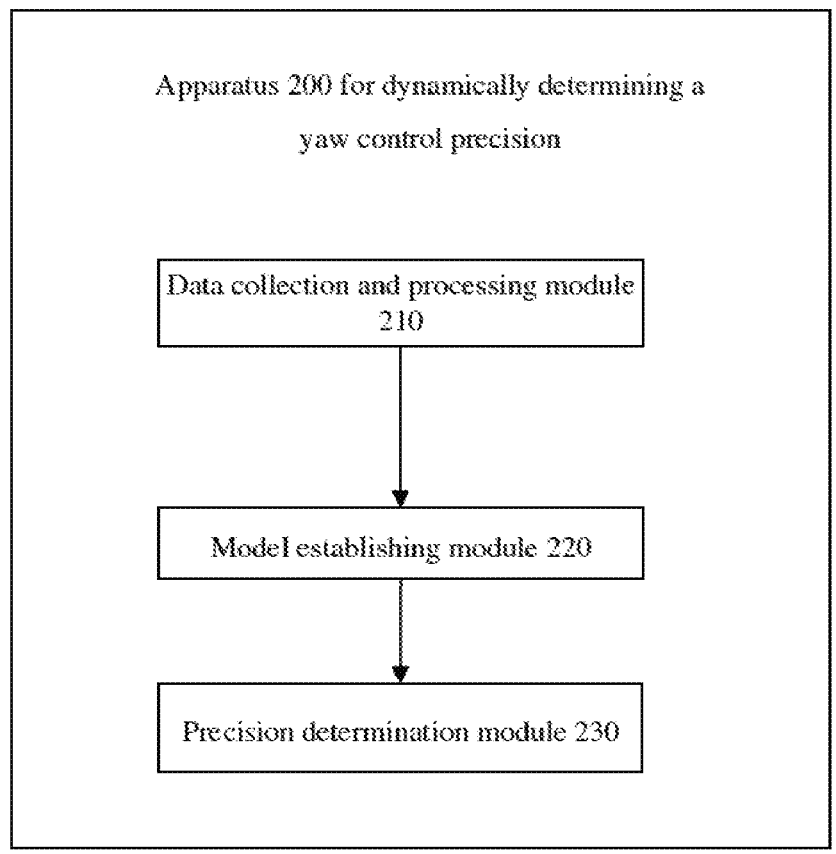
FIG. 2 shows a block diagram of an apparatus for dynamically determining a yaw control precision according to an exemplary embodiment of the present disclosure.

FIG. 2 shows a block diagram of an apparatus for dynamically determining a yaw control precision according to an exemplary embodiment of the present disclosure.

As shown in FIG. 2, the apparatus 200 for dynamically determining a yaw control precision according to the present exemplary embodiment may include a data collection and processing module 210, a model establishing module 220 and a precision determination module 230. The data collection and processing module 210 is configured to collect, during a predetermined time period, multiple pieces of wind speed data and multiple pieces of wind direction data and process the collected multiple pieces of wind speed data and multiple pieces of wind direction data; the model establishing module 220 is configured to establish, based on the processed wind speed data and wind direction data, a model of correspondence relationships between wind speed, variation angle of wind direction, yaw control precision, yaw fatigue value and power loss; and the precision determination module 230 is configured to determine, based on current wind speed data and wind direction data, a predetermined range of yaw fatigue value and a predetermined range of power loss, a yaw control precision corresponding to a current wind speed and a current variation angle of wind direction by using the model of correspondence relationships.

As an example, the data collection and processing module 210 collects, during the predetermined time period, multiple pieces of wind speed data, determines multiple wind speed compartments and a representative wind speed of each wind speed compartment, determines a wind speed compartment to which each of the collected multiple pieces of wind speed data belongs and adjusts each of the collected multiple pieces of wind speed data to a representative wind speed of a wind speed compartment to which the piece of wind speed data belongs. The data collection and processing module 210 may further collect, during the predetermined time period, multiple pieces of wind direction data, determines multiple wind direction compartments and a representative wind direction of each wind direction compartment, determines a wind direction compartment to which each of the collected multiple pieces of wind direction data belongs and adjusts each of the collected multiple pieces of wind direction data to a representative wind direction of a wind direction compartment to which the piece of wind direction data belongs. The wind speed data and/or wind direction data referred to hereinafter may be adjusted as described above. A step of the compartment may be defined according to a standard of International Electro technical Commission (abbreviated as IEC) or customized. For example, in a case that the step of a wind speed compartment is 0.5 m/s and a representative wind speed of the wind speed compartment is 3 m/s, wind speed data from 2.75 m/s to 3.25 m/s may be adjusted to 3 m/s; in a case that the step of a wind direction compartment is 5° and a representative wind direction of the wind direction compartment is 3, wind direction data from 1 to 6° may be adjusted to 3°.

In addition, the data collection and processing module 210 may further perform a low-pass filtering on the collected multiple pieces of wind speed data and multiple pieces of wind direction data to filter out interference data.

As an example, the model establishing module 220 determines a wind direction corresponding to each wind speed, calculates an angle variation value per unit time of the wind direction corresponding to each wind speed, and determines the angle variation value as the variation angle of the wind direction corresponding to the wind speed. An angle variation value per unit time of a wind direction corresponding to a current wind speed may be calculated and determined as a variation angle of the current wind direction. For example, in a case that the wind direction corresponding to the current wind speed is 5° and the wind direction varies from 5 to 8° within unit time, the variation angle of the current wind direction is 3.

As an example, the model establishing module 220 calculates a number of appearances of each variation angle of wind direction among variation angles of wind direction corresponding to each wind speed or an average of the variation angles of wind direction and determines a variation angle of wind direction having the largest number of appearances or the average of the variation angles of wind direction as the yaw control precision corresponding to the wind speed. For each wind speed, in a case that the variation angle of wind direction is calculated by using different unit times, multiple variation angles of wind direction may be obtained. In this case, the variation angle of wind direction having the largest number of appearances among the calculated multiple variation angles of wind direction or the average of the variation angles of wind direction may be determined as the yaw control precision corresponding to the wind speed. However, the present disclosure is not limited to the calculation method herein. Rather, the yaw control precision corresponding to each wind speed may be calculated by using other proper methods. For example, a table showing a correspondence relationship between wind speed and yaw control precision or a table showing correspondence relationships between wind speed, variation angle of wind direction and yaw control precision may be established so as to acquire a yaw control precision as needed.

As an example, the model establishing module 220 calculates a service life consumed by a yaw system by simulation with each wind speed, the variation angle of wind direction and the yaw control precision that are corresponding to each wind speed, and determines the service life as the yaw fatigue value.

As an example, the model establishing module 220 calculates power lost by the yaw system by simulation with each wind speed and the yaw control precision corresponding to each wind speed, and determines the power lost by the yaw system as the power loss.

As described above, a correspondence relationship between wind speed and variation angle of wind direction may be established by the operation of calculating the variation angle of wind direction corresponding to each wind speed. A correspondence relationship between wind speed and yaw control precision may be established by the operation of calculating the yaw control precision corresponding to each wind speed. Correspondence relationships between wind speed, variation angle of wind direction, yaw control precision and yaw fatigue value may be established by the operation of calculating the yaw fatigue value. Correspondence relationships between wind speed, yaw control precision and power loss may be established by the operation of calculating the power loss. The model of correspondence relationships between wind speed, variation angle of wind direction, yaw control precision, yaw fatigue value and power loss may be acquired based on these correspondence relationships. For example, based on the above correspondence relationships, a corresponding variation angle of wind direction can be acquired by a wind speed; a corresponding yaw control precision can be acquired by the wind speed; a corresponding yaw fatigue value can be acquired by the wind speed, the corresponding variation angle of wind direction and the corresponding yaw control precision; a corresponding power loss can be acquired by the wind speed and the corresponding yaw control precision, thereby acquiring the model of correspondence relationships.

The model of correspondence relationships may represent correspondence relationships between wind speed, variation angle of wind direction, yaw control precision, yaw fatigue value and power loss, such that at least one related group corresponding to a current wind speed and a current variation angle of wind direction may be determined. The at least one related group may have one yaw control precision, one yaw fatigue value and one power loss. Subsequently, a specific related group may be selected from the at least one related group based on a predetermined range of yaw fatigue value and a predetermined range of power loss. A yaw control precision in the specific related group is within the predetermined range of yaw fatigue value and a power loss in the specific related group is within the predetermined range of power loss. The yaw control precision in the specific related group may function as the yaw control precision corresponding to the current wind speed and the current variation angle of wind direction. If there are multiple specific related groups, a yaw control precision satisfying one of the following conditions may be selected from all yaw control precisions in the multiple specific related groups as a final yaw control precision: the largest yaw control precision among all the yaw control precisions, the smallest yaw control precision among all the yaw control precisions and an average value of all the yaw control precisions.

As an example, the apparatus according to the present exemplary embodiment may further include a precision adjustment module (not shown). The precision adjustment module is configure to adjust the yaw control precision as determined corresponding to the current wind speed and the current variation angle of wind direction based on at least one of the following: a magnitude of the current variation angle of wind direction, a topographic feature of a location of a wind turbine. For example, in a case that the current variation angle of wind direction is smaller than a first threshold, the yaw control precision should be improved; in a case that the current variation angle of wind direction is greater than a second threshold, the yaw control precision should be reduced.

According to exemplary embodiments of the present disclosure, in a case that the apparatus for dynamically determining a yaw control precision according to the present disclosure is not adopted, a yaw and a wind tracking are started if a variation angle of wind direction reaches 9° within 30 s and lasts for 3 min at 9°; in a case that the apparatus for dynamically determining a yaw control precision according to the present disclosure is adopted, a yaw control precision may vary from 9° to 3°, that is, a yaw and a wind tracking are started if the variation angle of wind direction reaches 3° within 30 s and lasts for 3 min at 3°. Thus, the yaw and the wind tracking may be started in advance, such that wind energy can be utilized earlier and more highly, thereby improving power generation efficiency.

The method and the apparatus for dynamically determining a yaw control precision according to exemplary embodiments of the present disclosure may be applied to dynamically determining a yaw control precision of a wind turbine. A yaw control precision may be dynamically determined based on wind speed data and wind direction data in daily operation data of a wind turbine and taking relationships between the wind speed, the variation angle of wind direction, the yaw control precision, the yaw fatigue value and the power loss into full considerations from a whole machine perspective. In addition, the determined yaw control precision may be adjusted, thereby achieving an self-adaptive adjustment of yaw control precision under different wind speeds and different variation angles of wind direction and achieving an optimal tracking of the yaw control precision, so as to capture wind energy maximally.

The method and the apparatus are simple, efficient and easy to realize. A yaw control precision can be dynamically determined and adjusted by modifying a program or instructions executed by a processor.

According to another exemplary embodiment of the present disclosure, a computer readable storage medium is provided. The computer readable storage medium stores instructions that, when executed by a processor, cause the processor to perform the method according to any of the above embodiments.

According to another exemplary embodiment of the present disclosure, an apparatus for dynamically determining a yaw control precision is provided. The apparatus includes a processor and a memory. The memory stores instructions that, when executed by a processor, cause the processor to perform the method according to any of the above embodiments.

The computer readable storage medium contains a program command, a data file, a data structure, or a combination thereof. A program recorded in the computer readable storage medium may be designed or configured to implement the method according to the present disclosure. The computer readable storage medium includes a hardware system configured to store and execute program instructions. Examples of the hardware system are a magnetic medium (such as a hard disk, a floppy disk and a magnetic tape), an optical medium (such as a CD-ROM and a DVD), a magneto-optical media (such as a floptical disk, a ROM, a RAM and a flash memory). The program includes assembly language codes or machine codes compiled by a compiler and advanced language codes interpreted by an interpreter. The hardware system can utilize at least one software module to implement in accordance with the present disclosure.

At least one part of the above method can be implemented by using one or more general-purpose or dedicated computers (for example, a processor, a controller, a digital signal processor, a microcomputer, a field programmable array, a programmable logic unit, a microprocessor or any other apparatus that can run software or execute instructions. The at least one part can be achieved in an operation system or in one or more software applications operated by an operation system.

Descriptions of the present disclosure are given for purposes of illustration and description. The descriptions are not intended to be exhaustive or limit the present disclosure in the form disclosed. Those skilled in the art may make various changes and modifications without departing from ideas of the present disclosure.

The invention claimed is:

1. A method for controlling a wind turbine, comprising:
obtaining a wind speed associated with the wind turbine;
obtaining a wind direction corresponding to the wind speed;
determining a plurality of variation angles of the wind direction, comprising:
for each unit time from a plurality of different unit times, calculating a corresponding angle variation value per unit time of the wind direction, so that the plurality of variation angles of the wind direction are determined according to the plurality of different unit times, respectively;
determining a yaw control precision corresponding to the wind speed based on the plurality of variation angles of the wind direction, wherein the yaw control precision is reduced from a first angle to a second angle which is equal to an average of the plurality of variation angles of the wind direction; and
performing a yaw tracking for the wind turbine according to the yaw control precision, so that a start of the yaw tracking for the wind turbine is changed from when a variation angle of the wind direction within a first time period reaches the first angle and lasts for a second time period at the first angle to when the variation angle of the wind direction within the first time period reaches the second angle and, lasts for the second time period at the second angle.

2. The method according to claim 1, further comprising:
collecting, during a predetermined time period, a plurality of wind speeds;
determining a plurality of wind speed ranges and a representative wind speed for each of the plurality of wind speed range;
determining, from the plurality of wind speed ranges, at least one wind speed range into which one or more of the collected plurality of wind speeds fall; and
adjusting each of the one or more of the collected plurality of wind speeds falling into the at least one wind speed range to the representative wind speed of the at least one wind speed range.

3. The method according to claim 1, further comprising adjusting the yaw control precision based on a current variation angle of the wind direction.

4. The method according to claim 1, further comprising adjusting the yaw control precision based on a topographic feature of a location of the wind turbine.

5. An apparatus for controlling a wind turbine, the apparatus comprising:
a memory storing instructions; and
a processor coupled to the memory, wherein the instructions, when executed by the processor, cause the processor to perform operations comprising:
obtaining a wind speed associated with the wind turbine;
obtaining a wind direction corresponding to the wind speed;
determining a plurality of variation angles of the wind direction, comprising:
for each unit time from a plurality of different unit times. calculating a corresponding angle variation value per unit time of the wind direction, so that the plurality of variation angles of the wind direction are determined according to the plurality of different unit times, respectively;
determining a yaw control precision corresponding to the wind speed based on the plurality of variation angles of the wind direction, wherein the yaw control precision is reduced from a first angle to a second angle which is equal to an average of the plurality of variation angles of the wind direction; and
performing a yaw tracking for the wind turbine according to the yaw control precision, so that a start of the yaw tracking for the wind turbine is chanced from when a variation angle of the wind direction within a first time period reaches the first angle and lasts for a second time period at the first angle to when the variation angle of the wind direction within the first time period reaches the second angle and lasts for the second time period at the second, angle.

6. The apparatus according to claim 5, wherein the operations further comprise:
collecting, during a predetermined time period, a plurality of wind speeds;
determining a plurality of wind speed ranges and a representative wind speed for each of the plurality of wind speed ranges;
determining, from the plurality of wind speed ranges, at least one wind speed range into which one or more of the collected plurality of wind speeds fall; and
adjusting each of the one or more of the collected plurality of wind speeds falling into the at least one wind speed range to the representative wind speed of the at least one wind speed range.

7. The apparatus according to claim 5, wherein the operations further comprise adjusting the yaw control precision based on a current variation angle of the wind direction.

8. The apparatus according to claim 5, wherein the operations further comprise adjusting the yaw control precision based on a topographic feature of a location of the wind turbine.

9. A non-transitory computer readable storage medium with instructions stored thereon, wherein the instructions, when executed by a processor, cause the processor to perform operations comprising:
obtaining a wind speed associated with the wind turbine;
obtaining a wind direction corresponding to the wind speed;
determining a plurality of variation angles of the wind direction. comprising:
for each unit time from a plurality of different unit times, calculating a corresponding angle variation value per unit time of the wind direction, so that the plurality of variation angles of the wind direction are determined according to the plurality of different unit times, respectively;

determining a yaw control precision corresponding to the wind speed based on the plurality of variation angles of the wind direction, wherein the yaw control precision reduced from a first angle to a second angle which is equal to an average of the plurality of variation angles of the wind direction; and performing a yaw tracking for the wind turbine according to the yaw control precision, so that a start of the yaw tracking for the wind turbine is changed from when a variation angle of the wind direction within a first time period reaches the first angle and lasts fax a second time period at the first angle to when the variation angle of the wind direction within the first time period reaches the second angle and lasts for the second time period at the second angle.

10. The non-transitory computer readable storage medium of claim 9, wherein the operations further comprise:

collecting, during a predetermined time period, a plurality of wind speeds;

determining a plurality of wind speed ranges and a representative wind speed for each of the plurality of wind speed ranges;

determining, from the plurality of wind speed ranges, at least one wind speed range into which one or more of the collected plurality of wind speeds fall; and adjusting each of the one or more of the collected plurality of wind speeds falling into the at least one wind speed range to the representative wind speed of the at least one wind speed range.

11. The non-transitory computer readable storage medium of claim 9, wherein the operations further comprise adjusting the yaw control precision based on a current variation angle of the wind direction.

12. The non-transitory computer readable storage medium of claim wherein the operations further comprise adjusting the yaw control precision based on a topographic feature of a location of the wind turbine.

\* \* \* \* \*